(12) United States Patent
Fujisawa et al.

(10) Patent No.: US 12,197,075 B2
(45) Date of Patent: Jan. 14, 2025

(54) BACKLIGHT AND LIQUID CRYSTAL DISPLAY DEVICE

(71) Applicant: Japan Display Inc., Tokyo (JP)

(72) Inventors: Koji Fujisawa, Tokyo (JP); Michihide Shibata, Tokyo (JP); Masafumi Okada, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/415,697

(22) Filed: Jan. 18, 2024

(65) Prior Publication Data

US 2024/0255801 A1 Aug. 1, 2024

(30) Foreign Application Priority Data

Jan. 27, 2023 (JP) ................................. 2023-010677

(51) Int. Cl.
*G02F 1/1335* (2006.01)
*F21V 8/00* (2006.01)
*G02F 1/13357* (2006.01)

(52) U.S. Cl.
CPC ..... *G02F 1/133607* (2021.01); *G02B 6/0016* (2013.01); *G02B 6/0038* (2013.01); *G02B 6/0053* (2013.01); *G02F 1/133603* (2013.01)

(58) Field of Classification Search
CPC ......... G02F 1/133603; G02F 1/133607; G02F 1/133611; G02B 6/0053; G02B 6/0016; G02B 6/0025; G02B 6/0036; G02B 6/0038

See application file for complete search history.

(56) References Cited

U.S. PATENT DOCUMENTS

| | | | | |
|---|---|---|---|---|
| 2002/0080598 A1* | 6/2002 | Parker | ............... | G02F 1/133615 362/330 |
| 2009/0190329 A1* | 7/2009 | Tsukada | ................. | G02B 5/045 359/599 |
| 2017/0293055 A1* | 10/2017 | Sun | ....................... | G02B 5/0242 |
| 2023/0324597 A1* | 10/2023 | Chang | .................. | G02B 5/0278 362/606 |

FOREIGN PATENT DOCUMENTS

JP 2001-195913 A 7/2001

* cited by examiner

*Primary Examiner* — Erin Kryukova
(74) *Attorney, Agent, or Firm* — XSENSUS LLP

(57) ABSTRACT

In a backlight that includes a plurality of LEDs and a prism sheet disposed opposite to the LEDs, the prism sheet has a first surface opposite to the LEDs and a second surface on the opposite side of the first surface, a first prism having a first base and a first pitch L1 is formed on the first surface, a second prism having a cross section that is scalene triangular in shape having a second base having a length L2, a first base angle θ1, and a second base angle θ2 smaller than the first base angle is formed on the second surface, and L2<L1.

8 Claims, 11 Drawing Sheets

Condition:
θ2=10 DEGREES
θ1=70 DEGREES    L2/L1=0.5

Result:
FWHM= FROM +10 DEGREES TO −15 DEGREES
Peak Brightness=0.94

Condition:
θ2=20 DEGREES
θ1=70 DEGREES    L2/L1=0.5

Result:
FWHM= FROM +10 DEGREES TO −20 DEGREES
Peak Brightness=0.86

Condition:
θ2=30 DEGREES
θ1=70 DEGREES    L2/L1=0.5

Result:
FWHM= FROM +10 DEGREES TO −25 DEGREES
Peak Brightness=0.72

Condition:
θ2=40 DEGREES
θ1=70 DEGREES    L2/L1=0.5

Result:
FWHM=FROM+11 DEGREES TO-24 DEGREES
Peak Brightness=0.62

Condition:
θ2=50 DEGREES
θ1=70 DEGREES    L2/L1=0.5

Result:
FWHM=FROM+12 DEGREES TO-15 DEGREES
Peak Brightness=0.61

Condition:
L2/L1=0.5
θ1=70 DEGREES    θ2=30 DEGREES

Result:
FWHM=FROM+10 DEGREES TO-25 DEGREES
Peak Brightness=0.72

Condition:
L2/L1=0.6
θ1=70 DEGREES   θ2=30 DEGREES

Result:
FWHM=FROM +11 DEGREES TO −28 DEGREES
Peak Brightness=0.70

Condition:
L2/L1=0.7
θ1=70 DEGREES   θ2=30 DEGREES

Result:
FWHM=FROM +11 DEGREES TO −30 DEGREES
Peak Brightness=0.60

Condition:
θ1=70 DEGREES
θ2=20 DEGREES   L2/L1=0.5

Result:
FWHM=FROM +10 DEGREES TO −20 DEGREES
Peak Brightness=0.86

Condition:
θ1=80 DEGREES
θ2=20 DEGREES    L2/L1=0.5

Result:
FWHM=FROM+10 DEGREES TO−20 DEGREES
Peak Brightness=0.88

Condition:
θ1=90 DEGREES
θ2=20 DEGREES    L2/L1=0.5

Result:
FWHM=FROM+10 DEGREES TO−20 DEGREES
Peak Brightness=0.91

Condition:
θ1=70 DEGREES
θ2=30 DEGREES    L2/L1=0.5

Result:
FWHM=FROM+10 DEGREES TO−20 DEGREES
Peak Brightness=0.72

FIG. 13B
Condition:
θ1=80 DEGREES
θ2=30 DEGREES    L2/L1=0.5
Result:
FWHM= FROM+11 DEGREES TO-25 DEGREES
Peak Brightness=0.76
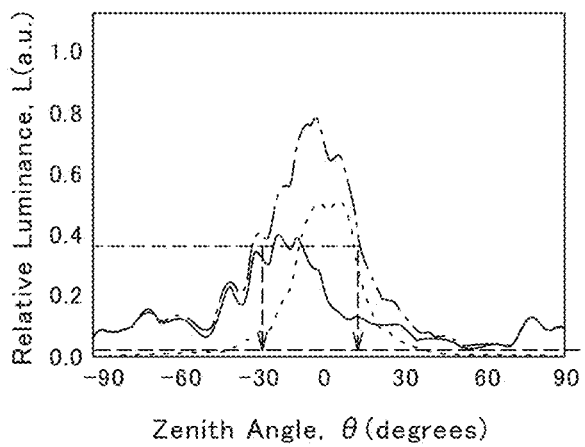
FIG. 13C
Condition:
θ1=90 DEGREES
θ2=30 DEGREES    L2/L1=0.5
Result:
FWHM= FROM+11 DEGREES TO-25 DEGREES
Peak Brightness=0.79
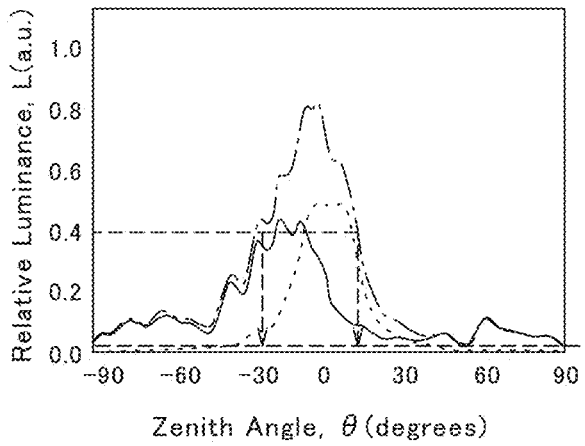
FIG. 14A
Preferable range of prism
| | |
|---|---|
| θ1 | 80~90° |
| θ2 | 20~30° |
| L2/L1 | 0.5~0.7 |

BACKLIGHT AND LIQUID CRYSTAL DISPLAY DEVICE

CROSS-REFERENCE TO RELATED APPLICATION

The present application claims priority from Japanese patent application JP 2023-010677 filed on Jan. 27, 2023, the content of which is hereby incorporated by reference into this application.

BACKGROUND

The present invention relates to a backlight that is of a thin type and has a distributed light distribution asymmetrical with respect to a normal line and a display device using the same.

In recent years, various display devices that are disposed on the dashboard of an automobile have been replaced by a liquid crystal display device using a backlight. Further, a display device, such as a car navigation system and a TV, is also disposed.

The display device mounted on the automobile is required to have characteristics different from those of a typical display device. For example, the characteristics include the reduction in the light distribution to the upper side from the display device in order to prevent the projection of the display screen onto the windshield, the requirement of a wide light distribution angle in the horizontal direction such that in such a case where the display device is disposed at the center of the dashboard, the display device can be seen from both of the driver's seat and the passenger's seat, and the like.

As the liquid crystal display device that performs such the solution, for example, Japanese Unexamined Patent Application Publication No. 2001-195913 is given.

SUMMARY

The display device is disposed at various positions of the dashboard of the automobile. Accordingly, in order to be easily seen from the driver, the display device is required to take a wide viewing angle in the horizontal direction. In other words, a light that exits from the liquid crystal display device is required to have the wide light distribution angle in the horizontal direction.

When the display device has the wide light distribution angle in the horizontal direction, the display may be projected onto the door glass of the automobile. On the outside of the door glass, a sideview mirror is disposed. That is, when the display of the display device is projected onto the door glass, the sideview mirror cannot be seen, so that the safety of the driving is inhibited.

By the way, since the liquid crystal does not emit a light by itself, the backlight is required. The light distribution characteristic of the liquid crystal display device as described above can be restated as the light distribution characteristic of the backlight. An object of the present invention is to achieve a liquid crystal display device or a backlight whose display can be visibly recognized from a driver's seat and a passenger's seat and is such as not to be projected onto a door glass.

The present invention solves the above problems, and main specific means are as follows.

(1) In a backlight that includes a plurality of LEDs and a prism sheet disposed opposite to the LEDs, the prism sheet has a first surface opposite to the LEDs and a second surface on the opposite side of the first surface, a first prism having a first base and a first pitch L1 is formed on the first surface, a second prism having a cross section that is scalene triangular in shape having a second base having a length L2, a first base angle, and a second base angle smaller than the first base angle is formed on the second surface, and L2<L1.

(2) In the backlight according to (1), in the prism sheet, L2/L1 is 0.5 or more and 0.7 or less.

(3) In the backlight according to (1), in the prism sheet, the first base angle is 80 degrees or more and 90 degrees or less.

(4) In the backlight according to (1), in the prism sheet, the second base angle is 20 degrees or more and 30 degrees or less.

(5) In a liquid crystal display device in which a backlight is disposed on a back surface of a liquid crystal display panel, the backlight is the backlight according to any one of (1) to (4).

BRIEF DESCRIPTION OF THE DRAWINGS

FIG. 13B is a graph illustrating a luminance distribution when the second angle θ2 of the anisotropic prism is 30 degrees, the L2/L1 of the anisotropic prism is 0.5, and the first angle θ1 of the anisotropic prism is 80 degrees;

FIG. 13C is a graph illustrating a luminance distribution when the second angle θ2 of the anisotropic prism is 30 degrees, the L2/L1 of the anisotropic prism is 0.5, and the first angle θ1 of the anisotropic prism is 90 degrees;

FIG. 14A illustrates an example of the specifications of the suitable prism sheet according to the present invention;

DESCRIPTION OF THE PREFERRED EMBODIMENTS

Hereinbelow, the present invention will be described in detail by an embodiment.

First Embodiment

Figure 1:
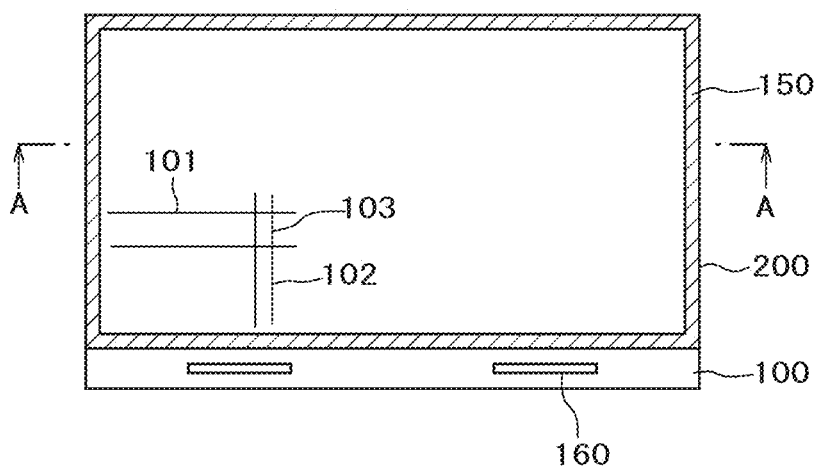
FIG. 1 is a plan view of a liquid crystal display device.

FIG. 1 is a plan view of a liquid crystal display device. The liquid crystal display device includes a liquid crystal display panel and a backlight, and in FIG. 1, the liquid crystal display panel is seen. In FIG. 1, in the liquid crystal display panel, a TFT substrate 100 formed with a pixel electrode, a video signal line, a scan line, a TFT (Thin Film Transistor) and the like, and an opposing substrate 200 formed with a black matrix, a color filter and the like are bonded via a seal material 150 in its periphery, and a liquid crystal is sealed in its interior.

In FIG. 1, a display region is formed in the portion in which the opposing substrate 200 and the TFT substrate 100 are overlapped. In the display region, scan lines 101 extend in the horizontal direction, and are arrayed in the vertical direction. In addition, video signal lines 102 extend in the vertical direction, and are arrayed in the horizontal direction. Pixels 103 are formed in the regions surrounded by the scan lines 101 and the video signal lines 102. The pixels 103 are formed in the display region in a matrix.

The TFT substrate 100 is formed to be larger than the opposing substrate 200, and the portion in which the TFT substrate 100 is not overlapped with the opposing substrate 200 is a terminal region. A driver IC 160 that connects the video signal lines 102 and the scan lines 101 is disposed in the terminal region. To supply a signal and a power supply from the outside, a flexible wiring substrate is connected to the terminal region, which is omitted in FIG. 1.

Figure 2:
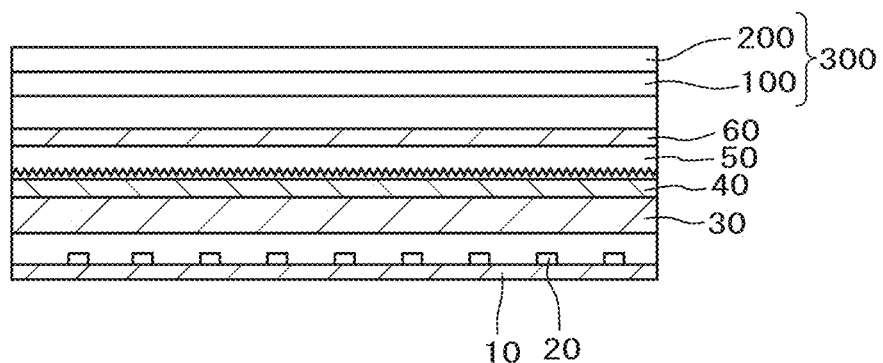
FIG. 2 is a cross-sectional view of the liquid crystal display device.

FIG. 2 is a cross-sectional view taken along line A-A of FIG. 1, and is a cross-sectional view of the liquid crystal display device. In FIG. 2, the backlight is disposed on the back surface of a liquid crystal display panel 300 including the TFT substrate 100 and the opposing substrate 200. The backlight is of a direct under type, and a plurality of LEDs 20 are used as light sources. In FIG. 2, a housing that accommodates the entire liquid crystal display device is omitted.

The backlight includes a reflection sheet 10, the plurality of LEDs 20 configuring the light sources, a diffusion plate 30, a diffusion sheet 40, a prism sheet 50, and a diffusion sheet 60 in that order from the lower side. Note that the structure of the backlight illustrated in FIG. 2 is an example, any one of the optical components may also be omitted, and a different optical sheet may also be added.

In FIG. 2, the reflection sheet 10 reflects a light that goes downward from the LED 20, to the direction of the liquid crystal display panel 300. Since the LED 20 is a point light source, the diffusion plate 30 is used in order to prevent the individual point light sources from being visibly recognized on the screen. Since the diffusion plate 30 has a role of placing thereon other optical components, the diffusion plate 30 is formed to be thick and to be, for example, approximately 1.5 mm. To prevent the warp of the diffusion plate 30, a spacer may also be disposed between the diffusion plate 30 and the reflection sheet 10. It should be noted that although in FIG. 2, the diffusion plate 30 is used as an example, the diffusion plate 30 is not necessarily required to be a plate, and may be replaced by a diffusion sheet. In this case, its thickness may be reduced.

In FIG. 2, the diffusion sheet 40 is disposed on the diffusion plate 30, and further diffuses the light that has not been able to be completely diffused by the diffusion plate 30. To control the light that attempts to be spread in the horizontal direction, the prism sheet 50 is disposed on the diffusion sheet 40. The prism sheet 50 of FIG. 2 is a so-called reverse prism sheet in which a prism array is formed on its lower surface. As described later, the prism sheet 50 is made to have a special structure, so that the present invention obtains the necessary light distribution characteristic of the backlight. In FIG. 2, on the prism sheet 50, the diffusion sheet 60 is disposed. This is for reducing moiré due to the interference between the components on the backlight side and the video signal lines 102, the scan lines 101, the black matrix, and the like that are formed on the liquid crystal display panel.

Figure 3:
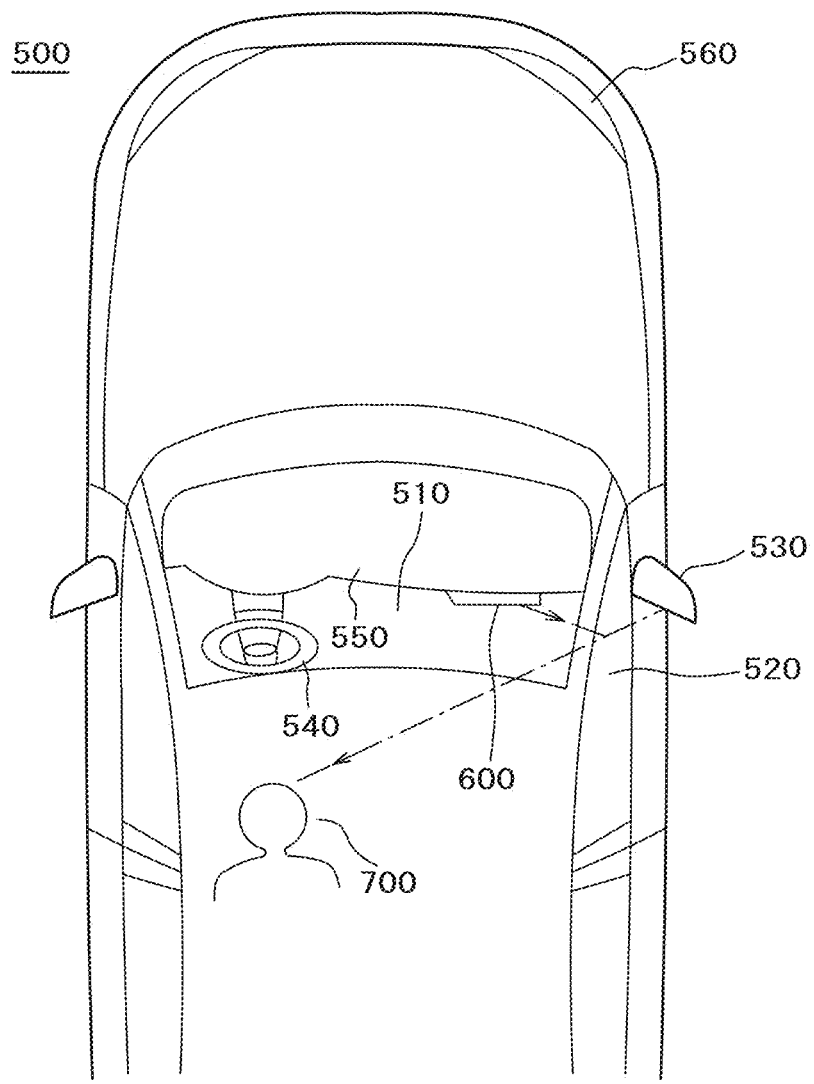
FIG. 3 is a plane perspective view of an automobile.

FIG. 3 is a perspective view of the front half portion of an automobile, seen from above. In FIG. 3, a light 560 is disposed in front of a hood, a windshield 510 is formed obliquely upward from the hood, and a roof is present thereon. A dashboard 550 is present inside the windshield 510, and a liquid crystal display device 600 is disposed on the dashboard 550. In FIG. 3, a sideview mirror 530 is mounted on a door, and a driver 700 visibly recognizes the sideview mirror 530 through a door glass 520.

However, when as indicated by the arrow of FIG. 3, the outgoing light from the liquid crystal display device 600 is projected onto and reflected on the door glass 520 and goes toward the driver 700, the driver 700 can see the screen of the display device but cannot see the sideview mirror 530, which is dangerous. The present invention solves such the problem.

Figure 4A:
FIG. 4A is a cross-sectional view of a reverse prism sheet.
Figure 4B:
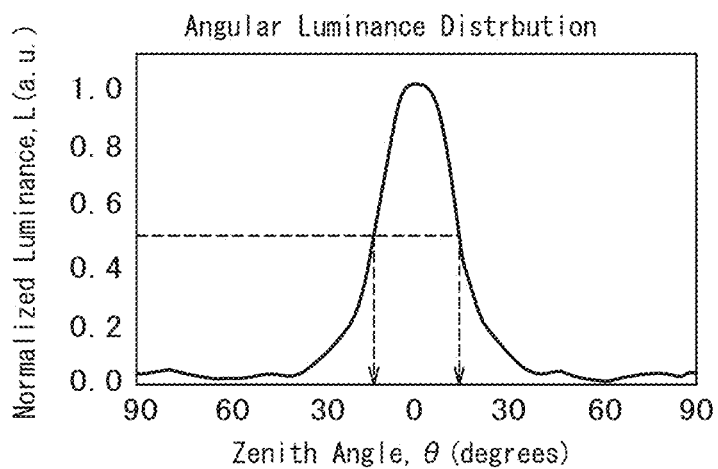
FIG. 4B illustrates the luminance distribution of a typical backlight.

FIGS. 4A and 4B illustrate a distributed light distribution when a typical reverse prism sheet is used. FIG. 4A is a cross-sectional view of the reverse prism sheet. FIG. 4B is a graph illustrating the distributed light distribution of the backlight when the reverse prism sheet of FIG. 4A is used. In FIG. 4B, the horizontal axis indicates the zenith angle (degrees) θ, and the vertical axis indicates the luminance normalized with a maximum value as 1. The luminance distribution of FIG. 4B is a substantially normal distribution. In FIG. 4B, the range indicated by two straight dotted arrows is an FWHM (Full Width Half Maximum).

However, with the distributed light distribution as illustrated in FIG. 4B, for example, the distributed light on the right side goes toward the door glass, is reflected on the door glass, and goes to the driver, thereby inhibiting the driver from seeing the sideview mirror. Accordingly, in the present invention, for example, the distributed light distribution on the right side is reduced, and as a result, for example, the distributed light distribution as illustrated in FIG. 5 is provided.

Figure 5:
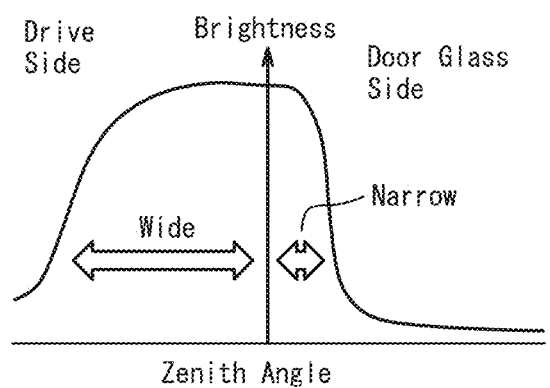
FIG. 5 illustrates the brightness distribution of a backlight intended in the present invention.

In FIG. 5, the horizontal axis indicates the zenith angle, and the vertical axis indicates the brightness. In FIG. 5, the distribution on the right side to the door glass side is narrow, and the distribution on the left side to the driver side is wide. Therefore, the light that goes from the display device toward the door glass side is reduced, and the reflection light that is reflected on the door glass to go toward the driver is also reduced. Therefore, the driver is not inhibited from seeing the sideview mirror.

Figure 6A:
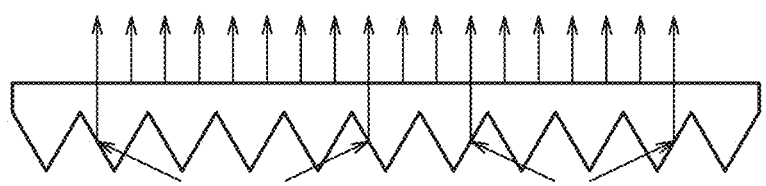
FIG. 6A is a cross-sectional view of the reverse prism sheet.
Figure 7A:
FIG. 7A is a cross-sectional view of a prism sheet having a scalene triangular cross section.
Figure 8A:
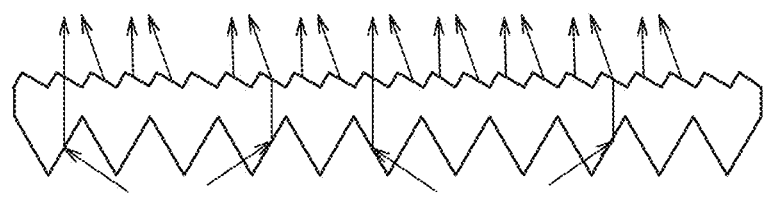
FIG. 8A is a cross-sectional view of a prism sheet according to the present invention.

FIGS. 6A, 7A, and 8A are cross-sectional views explaining the prism sheet structures according to the present invention that enable the backlight having the distributed light distribution as illustrated in FIG. 5. FIG. 6A is a cross-sectional view of the typical reverse prism sheet. As illustrated in FIG. 6A, the light that is indicated by the arrow and is incident with an angle with respect to the normal line direction of the reverse prism sheet is refracted by the reverse prism sheet, and exits to the normal line direction.

Figure 6B:
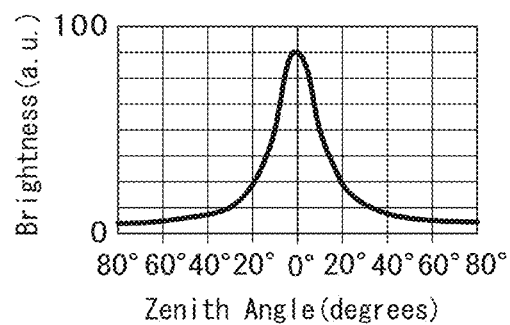
FIG. 6B illustrates an example of a brightness distribution by the typical reverse prism sheet.

FIG. 6B is a graph illustrating an example of the distributed light distribution corresponding to this. In FIG. 6B, the horizontal axis indicates the zenith angle (degrees), the vertical axis indicates the normalized brightness with the maximum value of the brightness as 100, and the unit is a.u. (arbitrary unit). As illustrated in FIG. 6B, the distributed light distribution of the light by the reverse prism sheet is a substantially normal distribution.

FIG. 7A is a cross-sectional view illustrating a state where an anisotropic prism array is formed on the upper side surface of the prism sheet. As illustrated in FIG. 7A, the light that is indicated by the arrow and is incident along the normal line direction of the prism sheet is refracted to the left direction by the anisotropic prism sheet.

Figure 7B:
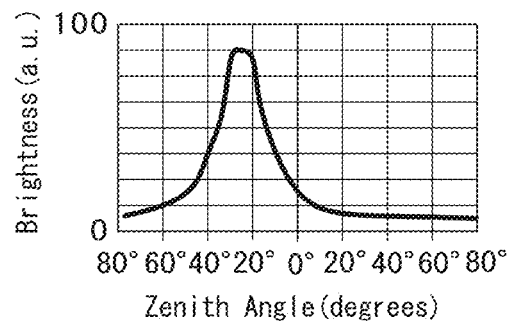
FIG. 7B illustrates an example of a brightness distribution by a prism array having a scalene triangular cross section.

FIG. 7B is a graph illustrating an example of a distributed light distribution corresponding to the prism sheet of FIG. 7A. In FIG. 7B, the peak of the distributed light distribution is not present in the portion in which the zenith angle on the horizontal axis is zero, but is present, for example, at around 25 degrees. That is, the light that is incident to the normal line direction of the prism sheet is refracted by approximately 25 degrees by the anisotropic prism sheet, and exits from the prism sheet.

Figure 8B:
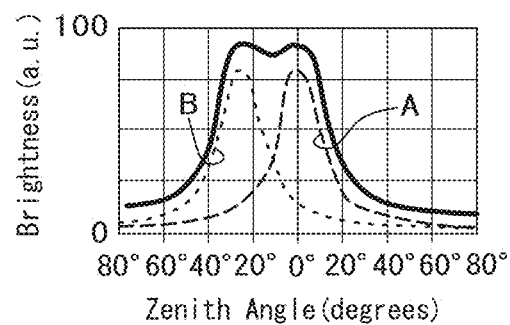
FIG. 8B illustrates an example of a brightness distribution corresponding to the cross-sectional view of the prism sheet according to the present invention.

FIGS. 8A and 8B are a cross-sectional view of the prism sheet according to the present invention having both of the characteristic of FIG. 6A and the characteristic of FIG. 7A and a graph illustrating its function. FIG. 8A is a cross-sectional view of the prism sheet of the present invention. In FIG. 8A, the same reverse prism array as FIG. 6A is formed on the lower side of the prism sheet. On the other hand, the anisotropic prism array as illustrated in FIG. 7A is formed on the upper surface of the prism sheet of FIG. 8A. However, in FIG. 8A, the anisotropic prism array of FIG. 7A is not formed as-is.

As illustrated in FIG. 8A, the anisotropic prism array is formed in, for example, one half region on the upper side of the prism sheet, and the other half region is flat. Therefore, half of the lights exiting from the prism sheet of FIG. 8A and receiving the function of the prism array of FIG. 6A exit, and the other half receiving the functions of the prism array of FIG. 6A and the prism array of FIG. 7A exit.

FIG. 8B is a graph illustrating the distributed light distribution of the light corresponding to the prism sheet of FIG. 8A. In FIG. 8B, the horizontal axis indicates the zenith angle, the vertical axis indicates the brightness, and on the vertical axis, the maximum value is 50 in order that FIG. 8B can be compared with FIGS. 6B and 7B. In FIG. 8B, the distributed light distribution as the entire prism sheet is as indicated by the solid line. This distributed light distribution has a form that combines the distributed light distribution that is indicated by the dotted line A and receives the influence of only the reverse prism array and the distributed light distribution that is indicated by the dotted line B and receives the influence of both of the reverse prism array and the anisotropic prism array.

It should be noted that since the area in which the anisotropic prism array is formed corresponds to the half of the area in which the reverse prism array is formed, the dotted line A and the dotted line B have the same peak. By the way, in FIG. 8A, the area in which the anisotropic prism array is formed is half the area in which the reverse prism array is formed, but the term "half" is an example, and how much of the area is appropriate will be described later.

Figure 9:
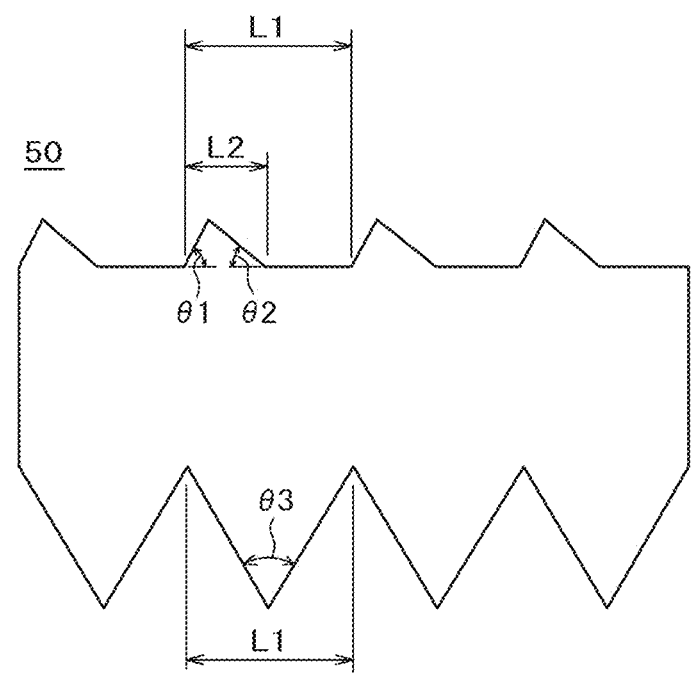
FIG. 9 is a cross-sectional view that defines the respective dimensions of the prism sheet according to the present invention used for simulation.

FIGS. 9 and 10A to 13C are drawings explaining the structures and functions of the prism sheet according to the present invention. FIG. 9 is a cross-sectional view of the prism sheet for defining the parameters illustrated in FIGS. 10A to 13C. In FIG. 9, the pitch of the reverse prism array in which the apex angle θ3 is, for example, 63 degrees is L1. It should be noted that the L1 may be restated as the length of the base of the reverse prism. The length of the base of the anisotropic prism array that is formed on the surface on the upper side of the prism sheet is L2, and the pitch of the anisotropic prism array is the L1 that is the same as the pitch of the reverse prism array. The first base angle of the anisotropic prism is θ1 (hereinafter, simply referred to as a first angle), and the second base angle is θ2 (hereinafter, simply referred to as a second angle). In FIGS. 10A to 13C, the characteristic of the prism sheet according to the present invention is evaluated by using the first angle θ1, the second angle θ2, and the L2/L1 of the anisotropic prism as the parameters.

Figure 10A:
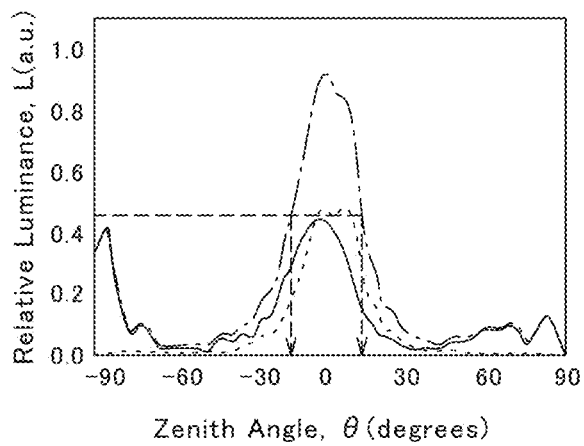
FIG. 10A is a graph illustrating an example of a luminance distribution when the first angle θ1 of an anisotropic prism is 70 degrees, the L2/L1 of the anisotropic prism is 0.5, and the second angle θ2 of the anisotropic prism is 10 degrees.

FIGS. 10A to 10E are graphs illustrating luminance distributions when the first angle θ1 of the anisotropic prism is fixed to 70 degrees, the L2/L1 of the anisotropic prism is fixed to 0.5, and the second angle θ2 of the anisotropic prism is changed from 10 degrees to 50 degrees. In FIG. 10A, the horizontal axis indicates the zenith angle (degrees), and the vertical axis indicates the luminance (a.u. (arbitrary unit)). In FIG. 10A, the solid line indicates the distributed light distribution of the light exiting from the anisotropic prism array, and the dotted line indicates the distributed light distribution of the light passing through only the reverse prism. Then, the alternate long and short dash line indicates the distributed light distribution of the entire prism sheet. It should be noted that the straight dotted arrows in FIG. 10A indicate the FWHM, which becomes the reference of the magnitude of the dispersion of the outgoing light of the entire prism sheet. The description of the drawings described above is the same up to FIG. 13C.

In FIG. 10A, in the light exiting from the anisotropic prism array, the peak is shifted to the minus side in the zenith angle, that is, shifted to the left side of the drawing. Therefore, also in the synthetic light distribution indicated by the alternate long and short dash line, the peak is shifted to the left side. In addition, the FWHM is also shifted to the minus side in the zenith angle. However, the peak of brightness that is caused in the normal line direction of the prism sheet is reduced to be 94%.

Figure 10B:
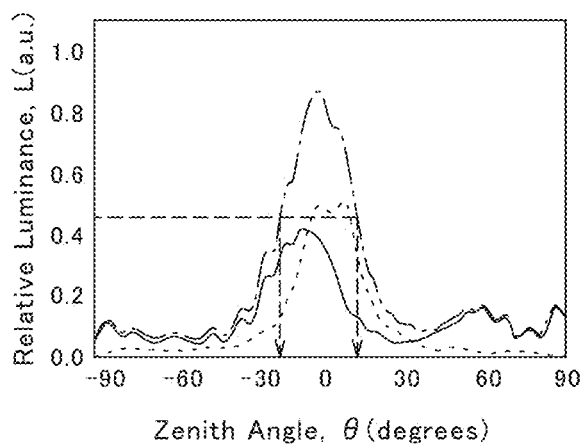
FIG. 10B is a graph illustrating an example of a luminance distribution when the first angle θ1 of the anisotropic prism is 70 degrees, the L2/L1 of the anisotropic prism is 0.5, and the second angle θ2 of the anisotropic prism is 20 degrees.

FIG. 10B illustrates the luminance distribution when the first angle θ1 of the anisotropic prism is fixed to 70 degrees, the L2/L1 of the anisotropic prism is fixed to 0.5, and the second angle θ2 of the anisotropic prism is 20 degrees. In FIG. 10B, the effect of the anisotropic prism is greater than the case of FIG. 10A, and therefore, the luminance distribution by the anisotropic prism indicated by the solid line is further shifted to the minus side in the zenith angle.

As a result, the entire brightness distribution indicated by the alternate long and short dash line is also shifted to the minus side in the zenith angle. The FWHM is also shifted to the left side, and is from 10 degrees to −20 degrees. The peak of the brightness is reduced to be 0.86.

Figure 10C:
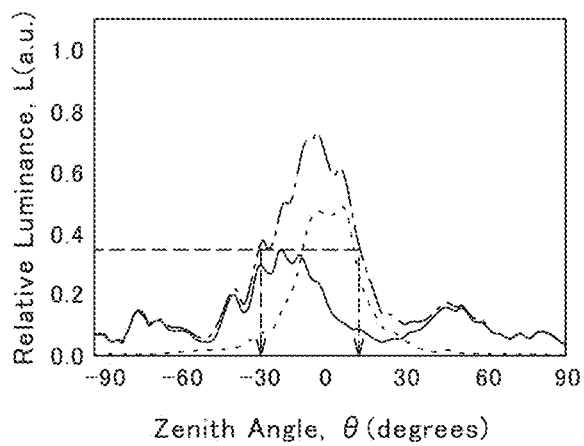
FIG. 10C is a graph illustrating an example of a luminance distribution when the first angle θ1 of the anisotropic prism is 70 degrees, the L2/L1 of the anisotropic prism is 0.5, and the second angle θ2 of the anisotropic prism is 30 degrees.

FIG. 10C illustrates the luminance distribution when the first angle θ1 of the anisotropic prism is fixed to 70 degrees, the L2/L1 of the anisotropic prism is fixed to 0.5, and the second angle θ2 of the anisotropic prism is 30 degrees. In FIG. 10C, the effect of the anisotropic prism is further greater than the case of FIG. 10B, and therefore, the luminance distribution by the anisotropic prism indicated by the solid line is further shifted to the minus side in the zenith angle.

As a result, the entire luminance distribution indicated by the alternate long and short dash line is also shifted to the minus side in the zenith angle. The FWHM is also shifted to the left side, and is from 10 degrees to −25 degrees. The peak of the brightness is reduced to be 0.72.

Figure 10D:
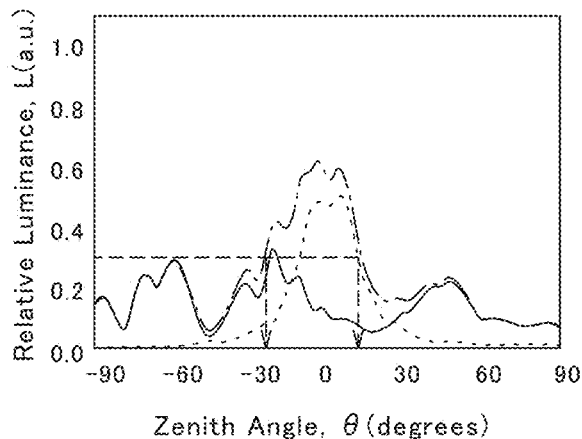
FIG. 10D is a graph illustrating an example of a luminance distribution when the first angle θ1 of the anisotropic prism is 70 degrees, the L2/L1 of the anisotropic prism is 0.5, and the second angle θ2 of the anisotropic prism is 40 degrees.

FIG. 10D illustrates the luminance distribution of the anisotropic prism when the first angle θ1 of the anisotropic prism is fixed to 70 degrees, the L2/L1 of the anisotropic prism is fixed to 0.5, and the second angle θ2 of the anisotropic prism is 40 degrees. In FIG. 10D, the effect of the anisotropic prism is further greater than the case of FIG. 10C, and therefore, the luminance distribution by the anisotropic prism indicated by the solid line is further shifted to the minus side in the zenith angle.

In FIG. 10D, in the luminance distribution by the anisotropic prism indicated by the solid line, the first peak is present at around −20 degrees in the zenith angle, and further, the second peak is present at around 60 degrees. This represents that the light incident onto the anisotropic prism array is totally reflected without being partly refracted on the prism surface. The totally reflected light is not to be controlled, which is not preferable. The FWHM in FIG. 10D is from 11 degrees to −24 degrees, and the peak of brightness is 0.62.

Figure 10E:
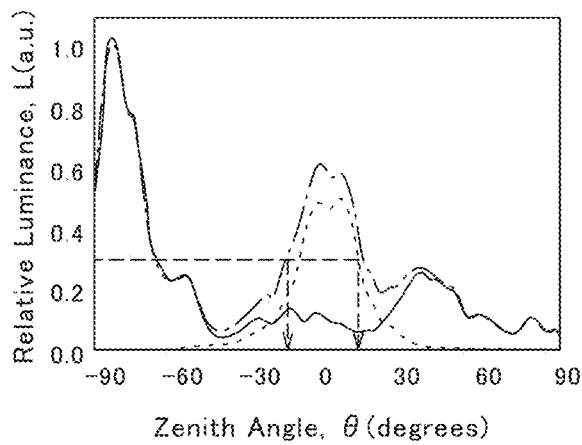
FIG. 10E is a graph illustrating an example of a luminance distribution when the first angle θ1 of the anisotropic prism is 70 degrees, the L2/L1 of the anisotropic prism is 0.5, and the second angle θ2 of the anisotropic prism is 50 degrees.

FIG. 10E illustrates the luminance distribution when the first angle θ1 of the anisotropic prism is fixed to 70 degrees, the L2/L1 of the anisotropic prism is fixed to 0.5, and the second angle θ2 of the anisotropic prism is 50 degrees. In FIG. 10E, in the luminance distribution by the anisotropic prism indicated by the solid line, the large peak is present in the portion exceeding-80 degrees. This represents that a further larger amount of the light incident onto the anisotropic prism array is totally reflected without being refracted on the prism surface. The totally reflected light is not to be controlled, which is not preferable. The FWHM in FIG. 10E is from 12 degrees to −15 degrees, and the peak of brightness is 0.61. However, since the totally reflected light is present, the use of FIGS. 10D and 10E cannot be simply compared with the use of FIGS. 10A to 10C.

When the above results are compared, when the first angle θ1 of the anisotropic prism is fixed to 70 degrees and the L2/L1 of the anisotropic prism is fixed to 0.5, it is possible to evaluate that the second angle θ2 of the anisotropic prism is suitably 20 to 30 degrees.

Figure 11A:
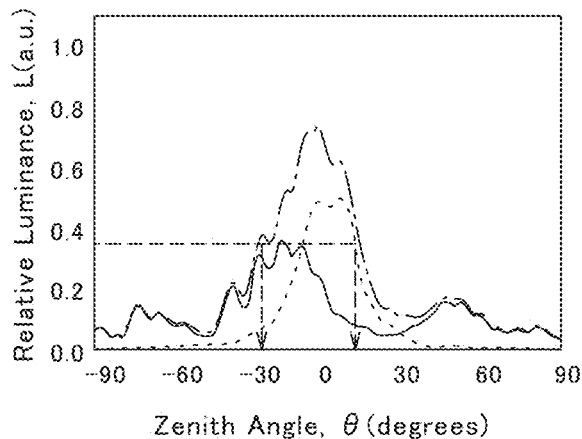
FIG. 11A is a graph illustrating a luminance distribution when the first angle θ1 of the anisotropic prism is 70 degrees, the second angle θ2 of the anisotropic prism is 30 degrees, and the L2/L1 of the anisotropic prism is 0.5.
Figure 11B:
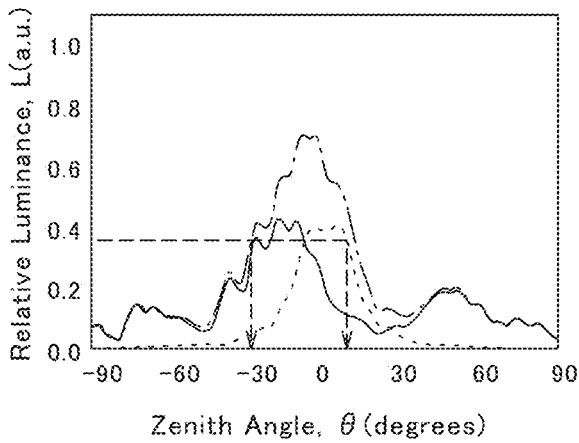
FIG. 11B is a graph illustrating a luminance distribution when the first angle θ1 of the anisotropic prism is 70 degrees, the second angle θ2 of the anisotropic prism is 30 degrees, and the L2/L1 of the anisotropic prism is 0.6.
Figure 11C:
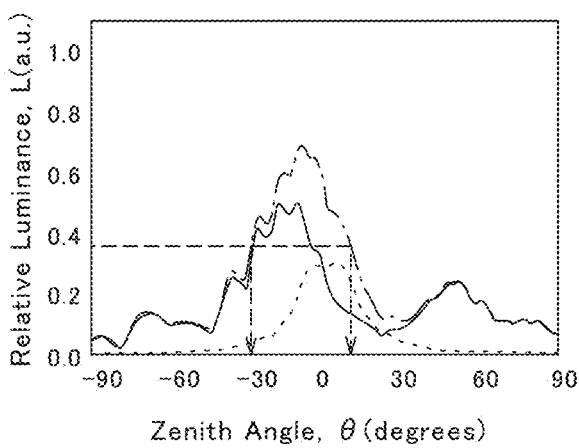
FIG. 11C is a graph illustrating a luminance distribution when the first angle θ1 of the anisotropic prism is 70 degrees, the second angle θ2 of the anisotropic prism is 30 degrees, and the L2/L1 of the anisotropic prism is 0.7.

FIGS. 11A to 11C are graphs illustrating luminance distributions when the first angle θ1 of the anisotropic prism is fixed to 70 degrees, the second angle θ2 of the anisotropic prism is fixed to 30 degrees, and the L2/L1 of the anisotropic prism is changed from 0.5 to 0.7. The horizontal axis, the vertical axis, and the like of each of the graphs are as described in FIG. 10A.

FIG. 11A illustrates the case where the L2/L1 is 0.5. In FIG. 11A, in the light exiting from the anisotropic prism array indicated by the solid line, the peak is shifted to the minus side in the zenith angle, that is, to the left side of the drawing. Therefore, also in the synthetic light distribution indicated by the alternate long and short dash line, the peak is shifted to the left side. In addition, the FWHM is also shifted to the minus side in the zenith angle, and is 10 degrees to −25 degrees in the zenith angle. The peak of the synthetic brightness indicated by the alternate long and short dash line is 0.72.

FIG. 11B illustrates the case where the L2/L1 is 0.6. In FIG. 11B, in the light exiting from the anisotropic prism array indicated by the solid line, the peak is shifted to the minus side in the zenith angle, that is, to the left side of the drawing. Therefore, also in the synthetic light distribution indicated by the alternate long and short dash line, the peak is shifted to the left side. In addition, the FWHM is also shifted to the minus side in the zenith angle, and is 11 degrees to −28 degrees in the zenith angle. The peak of the synthetic brightness indicated by the alternate long and short dash line is 0.70.

FIG. 11C illustrates the case where the L2/L1 is 0.7. In FIG. 11C, in the light exiting from the anisotropic prism array indicated by the solid line, the peak is shifted to the minus side in the zenith angle, that is, to the left side of the drawing. Therefore, also in the synthetic light distribution indicated by the alternate long and short dash line, the peak is shifted to the left side. In addition, the FWHM is also shifted to the minus side in the zenith angle, and is 11 degrees to −30 degrees in the zenith angle. The peak of the synthetic brightness indicated by the alternate long and short dash line is 0.60.

As illustrated in FIGS. 11A to 11C, when the first angle θ1 of the anisotropic prism is fixed to 70 degrees, the second angle θ2 of the anisotropic prism is fixed to 30 degrees, and the L2/L1 of the anisotropic prism is changed from 0.5 to 0.7, the characteristic of the prism sheet causes no significant change. Therefore, the L2/L1 should be set so as to correspond to the designing specifications.

Figure 12A:
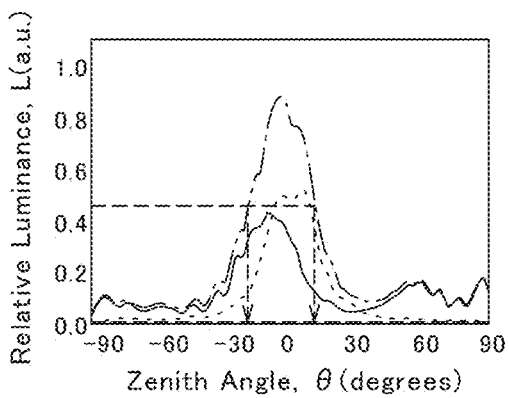
FIG. 12A is a graph illustrating a luminance distribution when the second angle θ2 of the anisotropic prism is 20 degrees, the L2/L1 of the anisotropic prism is 0.5, and the first angle θ1 of the anisotropic prism is 70 degrees.
Figure 12B:
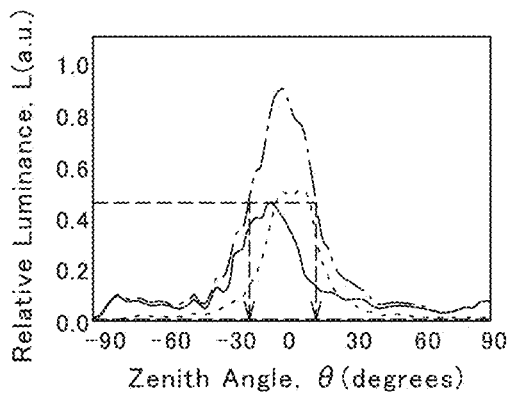
FIG. 12B is a graph illustrating a luminance distribution when the second angle θ2 of the anisotropic prism is 20 degrees, the L2/L1 of the anisotropic prism is 0.5, and the first angle θ1 of the anisotropic prism is 80 degrees.
Figure 12C:
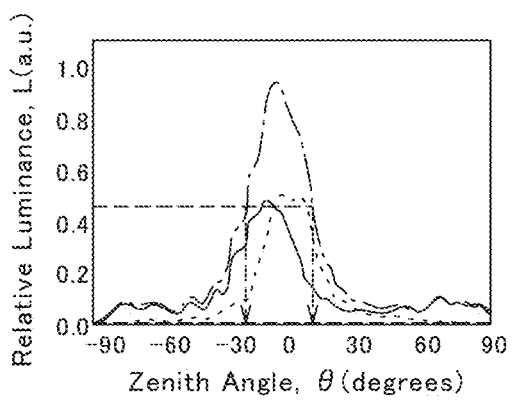
FIG. 12C is a graph illustrating a luminance distribution when the second angle θ2 of the anisotropic prism is 20 degrees, the L2/L1 of the anisotropic prism is 0.5, and the first angle θ1 of the anisotropic prism is 90 degrees.

FIGS. 12A to 12C are graphs illustrating brightness distributions when the second angle θ2 of the anisotropic prism is fixed to 20 degrees, the L2/L1 of the anisotropic prism is fixed to 0.5, and the first angle θ1 of the anisotropic prism is changed from 70 degrees to 90 degrees. The horizontal axis, the vertical axis, and the like of each of the graphs are as described in FIG. 10A.

FIG. 12A illustrates the case where the first angle θ1 is 70 degrees. In FIG. 12A, in the light exiting from the anisotropic prism array indicated by the solid line, the peak is shifted to the minus side in the zenith angle, that is, to the left side of the drawing. Therefore, also in the synthetic light distribution indicated by the alternate long and short dash line, the peak is shifted to the left side. In addition, the FWHM is also shifted to the minus side in the zenith angle, and is 10 degrees to −20 degrees in the zenith angle. The peak of the synthetic brightness indicated by the alternate long and short dash line is 0.86.

FIG. 12B illustrates the case where the first angle θ1 is 80 degrees. In FIG. 12B, in the light exiting from the anisotropic prism array indicated by the solid line, the peak is shifted to the minus side in the zenith angle, that is, to the left side of the drawing. Therefore, also in the synthetic light distribution indicated by the alternate long and short dash line, the peak is shifted to the left side. In addition, the FWHM is also shifted to the minus side in the zenith angle, and is 10 degrees to −20 degrees in the zenith angle. The peak of the synthetic brightness indicated by the alternate long and short dash line is 0.88.

FIG. 12C illustrates the case where the first angle θ1 is 90 degrees. In FIG. 12C, in the light exiting from the anisotropic prism array indicated by the solid line, the peak is shifted to the minus side in the zenith angle, that is, to the left side of the drawing. Therefore, also in the synthetic light distribution indicated by the alternate long and short dash line, the peak is shifted to the left side. In addition, the FWHM is also shifted to the minus side in the zenith angle, and is 10 degrees to −20 degrees in the zenith angle. The peak of the synthetic brightness indicated by the alternate long and short dash line is 0.91.

When FIGS. 12A and 12C are compared with one another, the FWHM is almost the same, but the peak value of the synthetic brightness is further larger when the first angle θ1 is 80 degrees and 90 degrees. Therefore, when the second angle θ2 of the anisotropic prism is fixed to 20 degrees and the L2/L1 of the anisotropic prism is fixed to 0.5, when other conditions are allowed, the first angle θ1 of the anisotropic prism is preferably set to 80 degrees to 90 degrees.

Figure 13A:
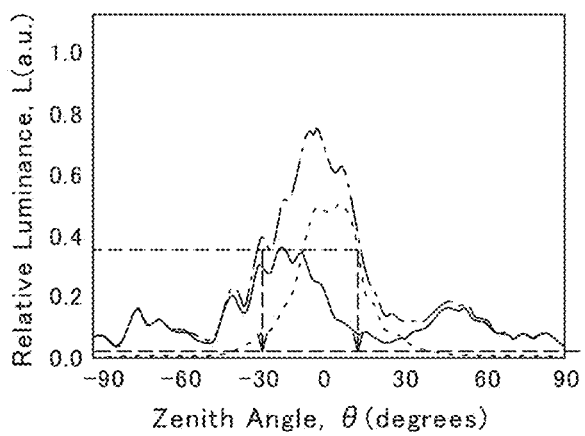
FIG. 13A is a graph illustrating a luminance distribution when the second angle θ2 of the anisotropic prism is 30 degrees, the L2/L1 of the anisotropic prism is 0.5, and the first angle θ1 of the anisotropic prism is 70 degrees.

FIGS. 13A to 13C are graphs illustrating luminance distributions when the second angle θ2 of the anisotropic prism is fixed to 30 degrees, the L2/L1 of the anisotropic prism is fixed to 0.5, and the first angle θ1 of the anisotropic prism is changed from 70 degrees to 90 degrees. The horizontal axis, the vertical axis, and the like of each of the graphs are as described in FIG. 10A.

FIG. 13A illustrates the case where the first angle θ1 is 70 degrees. In FIG. 13A, in the light exiting from the anisotropic prism array indicated by the solid line, the peak is shifted to the minus side in the zenith angle, that is, to the left side of the drawing. Therefore, also in the synthetic light distribution indicated by the alternate long and short dash line, the peak is shifted to the left side. In addition, the FWHM is also shifted to the minus side in the zenith angle, and is 10 degrees to −25 degrees in the zenith angle. The peak of the synthetic brightness indicated by the alternate long and short dash line is 0.72.

FIG. 13B illustrates the case where the first angle θ1 is 80 degrees. In FIG. 13B, in the light exiting from the anisotropic prism array indicated by the solid line, the peak is shifted to the minus side in the zenith angle, that is, to the left side of the drawing. Therefore, also in the synthetic light distribution indicated by the alternate long and short dash line, the peak is shifted to the left side. In addition, the FWHM is also shifted to the minus side in the zenith angle, and is 11 degrees to −25 degrees in the zenith angle. The peak of the synthetic brightness indicated by the alternate long and short dash line is 0.76.

FIG. 13C illustrates the case where the first angle θ1 is 90 degrees. In FIG. 13C, in the light exiting from the anisotropic prism array indicated by the solid line, the peak is shifted to the minus side in the zenith angle, that is, to the left side of the drawing. Therefore, also in the synthetic light distribution indicated by the alternate long and short dash line, the peak is shifted to the left side. In addition, the FWHM is also shifted to the minus side in the zenith angle, and is 11 degrees to −25 degrees in the zenith angle. The peak of the synthetic brightness indicated by the alternate long and short dash line is 0.79.

When FIGS. 13A and 13C are compared with one another, the FWHM is almost the same, but the peak value of the synthetic brightness is further larger when the first angle θ1 is 80 degrees and 90 degrees. Therefore, when the second angle θ2 of the anisotropic prism is fixed to 30 degrees and the L2/L1 of the anisotropic prism is fixed to 0.5, when other conditions are allowed, the first angle θ1 of the anisotropic prism is preferably set to 80 degrees to 90 degrees.

Figure 14B:
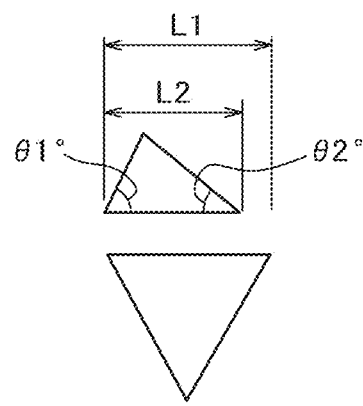
FIG. 14B is a cross-sectional view of the prism corresponding to FIG. 14A.

FIGS. 14A and 14B illustrate the preferable range of the shape of the prism sheet, in particular, the anisotropic prism, from the results illustrated in FIGS. 10A to 13C. In FIG. 14A, the table describes the preferable range of the first angle θ1, the second angle θ2, and the L2/L1. That is, in the preferable range, the first angle θ1 of the anisotropic prism is 80 degrees to 90 degrees, the second angle of the anisotropic prism is 20 degrees to 30 degrees, and the L2/L1 of the anisotropic prism is 0.5 to 0.7.

Each of the parameters is as described in FIG. 9, and is also described in the cross-sectional view of FIG. 14B. In this drawing, the L1 can be referred to as the length of the base of the reverse prism, and the L2 can be referred to as the length of the base of the anisotropic prism.

Figure 15:
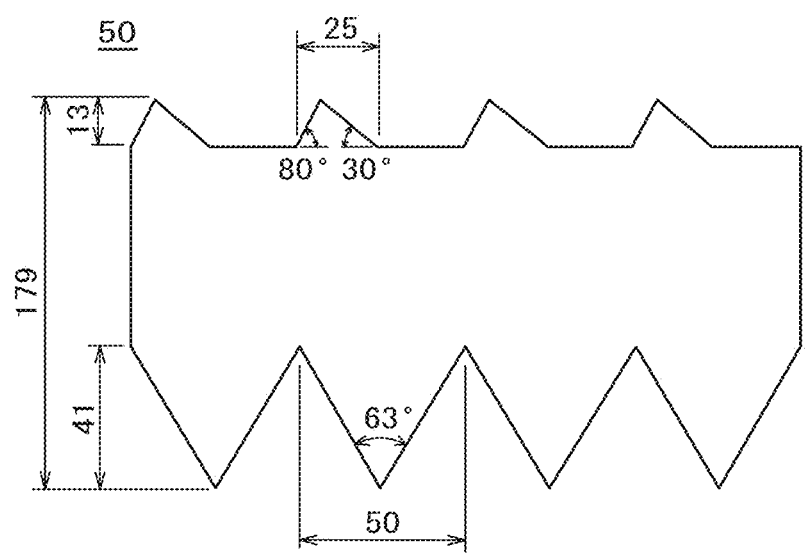
FIG. 15 is a cross-sectional view illustrating an example of the suitable prism sheet according to the present invention.

FIG. 15 is a cross-sectional view illustrating an example of the prism sheet when the anisotropic prism array as illustrated in FIGS. 14A and 14B is used. The unit of the numerical value of FIG. 15 is μm. In FIG. 15, the pitch of the reverse prism array is 50 μm, and the apex angle of the reverse prism is 63 degrees. On the other hand, the length of the base of the anisotropic prism formed on the surface on the upper side is 25 μm, the first angle of the anisotropic prism is 80 degrees, and the second angle of the anisotropic prism is 30 degrees. The height of the anisotropic prism is 13 μm, and this is a value determined by the first angle θ1, the second angle θ2, and the length L2 of the base. The thickness of the entire prism sheet also including the prism is 179 μm, and the thickness of the substrate portion except for the prism portion is 125 μm.

As described above, when the liquid crystal display device using the backlight having the prism sheet as described in FIGS. 9 to 15 is used, the light from the display device can be set so as to be directed to the necessary direction and not to be directed to the direction in which the light is not desired to be distributed.

What is claimed is:

1. A backlight that includes a plurality of LEDs and a prism sheet disposed opposite to the LEDs,
    wherein the prism sheet has a first surface opposite to the LEDs and a second surface on the opposite side of the first surface,
    wherein a first prism having a first base and a first pitch L1 is formed on the first surface,
    wherein a second prism having a cross section that is scalene triangular in shape having a second base having a length L2, a first base angle, and a second base angle smaller than the first base angle is formed on the second surface, and
    wherein L2<L1.

2. The backlight according to claim 1,
    wherein the length of the base of the first prism is the same as the first pitch L1.

3. The backlight according to claim 1,
    wherein the cross section of the first prism is an isosceles triangle.

4. The backlight according to claim 1,
    wherein in the prism sheet, L2/L1 is 0.5 or more and 0.7 or less.

5. The backlight according to claim 1,
    wherein in the prism sheet, the first base angle is 80 degrees or more and 90 degrees or less.

6. The backlight according to claim 1,
    wherein in the prism sheet, the second base angle is 20 degrees or more and 30 degrees or less.

7. The backlight according to claim 1,
    wherein a diffusion sheet is disposed between the plurality of LEDs and the prism sheet.

8. A liquid crystal display device in which a backlight is disposed on a back surface of a liquid crystal display panel,
    wherein the backlight is the backlight according to claim 1.

* * * * *